United States Patent
Neger, III (10) Patent No.: US 11,891,182 B2
(45) Date of Patent: Feb. 6, 2024

(54) MULTI-AXIS PARACHUTE AND SKYDIVING SIMULATOR

(71) Applicant: William Charles Neger, III, Deland,, FL (US)

(72) Inventor: William Charles Neger, III, Deland,, FL (US)

(73) Assignee: Flight-1 Technologies, LLC, Deland, FL (US)

( * ) Notice: Subject to any disclaimer, the term of this patent is extended or adjusted under 35 U.S.C. 154(b) by 0 days.

(21) Appl. No.: 18/158,016

(22) Filed: Jan. 23, 2023

(65) Prior Publication Data

US 2023/0150677 A1  May 18, 2023

(51) Int. Cl.
*G09B 19/00* (2006.01)
*B64D 23/00* (2006.01)

(52) U.S. Cl.
CPC .................................. *B64D 23/00* (2013.01)

(58) Field of Classification Search
CPC .... G09B 19/00; G09B 19/0038; A63G 31/00; A63G 2031/005
USPC ...................... 434/247, 258; 472/49, 50, 136
See application file for complete search history.

(56) References Cited

U.S. PATENT DOCUMENTS

| | | | | |
|---|---|---|---|---|
| 4,578,037 A | * | 3/1986 | Macangus | A63G 31/00 434/258 |
| 5,593,352 A | * | 1/1997 | Methfessel | B64D 23/00 73/147 |
| 5,655,909 A | * | 8/1997 | Kitchen | A63G 31/00 472/49 |
| 6,929,480 B2 | * | 8/2005 | Lee | A63G 31/00 434/258 |
| 7,819,664 B2 | * | 10/2010 | Petruk | A63G 31/00 434/59 |
| RE43,028 E | * | 12/2011 | Kitchen | A63G 31/00 472/136 |
| 11,058,960 B2 | * | 7/2021 | Metni | A63G 31/00 |
| 2009/0312111 A1 | * | 12/2009 | Gil | A63G 31/00 472/137 |
| 2010/0240454 A1 | * | 9/2010 | Xiao | A63G 31/16 463/30 |
| 2018/0134420 A1 | * | 5/2018 | Kwon | B64G 7/00 |
| 2019/0318646 A1 | * | 10/2019 | Yeom | G09B 9/00 |

* cited by examiner

*Primary Examiner* — Kurt Fernstrom (57) ABSTRACT

A multi-axis parachute and skydiving module simulator comprising a multi-directional gimbal assembly and cable assembly that provide the combination of motions and simulations to produce real parachute flight characteristics.

18 Claims, 6 Drawing Sheets

MULTI-AXIS PARACHUTE AND SKYDIVING SIMULATOR

CROSS-REFERENCE TO RELATED APPLICATION

Not Applicable.

TECHNICAL FIELD

The present invention relates generally to a skydiving simulator. More specifically, the present invention relates to a parachute and skydiving training module and simulator which provides multi-directional movement to accurately mimic live parachute jumps.

BACKGROUND

In recent years, commercial parachuting jumping and skydiving has become increasingly popular. The activity involved jumping from an aircraft such as a helicopter or airplane and then controlling the speed of descent by using a parachute. In order to successfully parachute jump or skydive, the jumper must first ride in an aircraft to a certain altitude and then exit the aircraft and safely make his or her way down to the terrain, releasing the parachute at the appropriate altitude. The knowledge of how to exit the aircraft, when to jump, how to control one's body, or at what altitude to deploy the parachute is required to successfully parachute jump or skydive. In order to obtain and retain this knowledge, training is required.

Traditional parachute jumping and skydiving training simulators involve some degree of vertical motion coupled with a harness and a visual simulation that is provided through virtual reality goggles. Traditional parachute jumping and skydiving training simulators lift the user off the ground vertically, allowing the user to remain suspended on either the x-axis or y-axis. The user may be exposed to generated air flow while wearing the virtual reality goggles. The user is vertically lowered back to the ground at the end of the training simulation.

While the known prior art allows users to experience a vertical landing, the users do not experience the stresses, strains, and forces of changing directions, sharp turns for landing, and swinging forces that a jumper may experience during his or her descent. By experiencing multi-axis movement with the visual simulation, a user may train more effectively in the art of skydiving.

Accordingly, a need exists for a new and novel multi-axis parachute and skydiving module simulator that will provide the combination of motions and simulations that will produce real parachute flight characteristics.

Definitions

It is to be understood that in the present disclosure, all embodiments are provided as illustrative and non-limiting representatives of many possible embodiments. In addition, the terms "is," "can," "will," and the like are herein used as synonyms for and interchangeable with terms such as "may," "may provide for," and "it is contemplated that the present invention may" and so forth.

Furthermore, all elements listed by name, such as inverted, hydroponics, seed, spout, frequency, growth, and so forth are herein meant to include or encompass all equivalents for such elements. Such equivalents are contemplated for each element named in its particular herein.

For purposes of summarizing, certain aspects, advantages, and novel features of the present invention are provided herein. It is to be understood that not all such aspects, advantages, or novel features may be provided in any one particular embodiment. Thus, the disclosed subject matter may be embodied or carried out in a manner that achieves or optimizes one aspect, advantage, or novel feature or group of features without achieving all aspects, advantages, or novel features as may be taught or suggested.

Multi-Axis: as used herein, the term "multi-axis" or "multi-axis movement" shall mean movement along the x, y, and z axis of the present invention, recreating the movements of a typical aerodynamic model to relative movement along the roll (x), pitch (y), and yaw (z) axis of the jumper when in engaged in a live or simulated parachute jump or skydive.

Stabilizing Shaft: as used herein, the term "stabilizing shaft" shall mean the long cylindrical rod member extending vertically to support and house the electronic components and the assembly of the present invention.

Gimbal Assembly: as used herein, the term "gimbal assembly" shall mean the mechanism comprising of a radial torque motor and gimbal rings which is configured to pivot in multi-axis directions.

Jumper: as used herein, the term "jumper" shall mean an individual who exits an aircraft from a high altitude and uses a parachute to descend to the ground. A jumper may also be used synonymously as a user of the present invention.

Jump Force: as used herein, the term "jump force" shall mean the stresses, strains, and forces jumpers experience when changing directions, taking turns, or landing during a descent from an aircraft.

Steering Cables: as used herein, the term "steering cables" shall mean the two cables located on the left and the right side of the jumper and connected to the steering motor that allow a user to manipulate the parachute to turn to the left or the right, creating movement along the x-axis (roll) and z-axis (yaw) and configured to allow a user to move the multi-axis plate to the left or to the right radially, while also banking the jumper along the roll axis. By way of non-limiting example, a jumper may pull both steering lines together to slow the parachute to a straight path, and likewise create movement around the y-axis (pitch).

As used herein, words and terms referring to parachuting, jumping, skydiving, and movement shall have their ordinary meaning, as known in the field of the art.

SUMMARY OF THE INVENTION

In view of the foregoing disadvantages inherent in the known art, the present invention relates to multi-axis parachute and skydiving module simulator that overcomes the deficiencies of the prior art. The general purpose of the present invention, which shall be described subsequently in greater detail, is to provide a novel parachute jumping and skydiving simulator that jumpers may use to experience real jump forces and simulated flight movements.

The features of the invention which are believed to be novel are particularly pointed out and distinctly claimed in the concluding portion of the specification. By way of a non-limiting example, the present invention provides a novel solution for a jumper to experience multi axis and physical motions when utilizing a parachute and skydiving simulator. These and other features, aspects, and advantages of the present invention will become better understood with reference to the following drawings and detailed description.

The present invention provides for a multi-axis parachute and skydiving module simulator that comprises of a dome housing, stabilizing shaft, radial motor, gimbal assembly, cable assembly, a plurality of sensors, a parachute harness, and a fan. In a preferred embodiment, the gimbal assembly is attached to the interior of the dome housing. The gimbal assembly, located at the proximal end of the stabilizing shaft, comprises of a radial torque motor, a motor housing, a support plate, and gimbal rings.

In another preferred embodiment of the present invention, the cable assembly configured to control the cable steering assembly, is located as the distal end of the stabilizing shaft and comprises and electronic assembly, a rear cable lift motor, a right cable lift motor, a left cable lift motor, and the associated cable spools. The right and left cables are connected to the right and left side of the parachute harness. The rear cable is connected to the rear of the parachute harness, or, in an alternative configuration, the rear cable may be removably connected to the legs of the jumper while the present invention is in use. The harness is configured to move up and down along the z-axis. When in use, the gimbal assembly rotates the harness about the z-axis (yaw).

In some embodiments, the right cable lift motor is connected to the right cable spool and is configured to lift the right side of the parachute harness. The left cable lift motor is connected to the left cable spool and is configured to lift the left side of the parachute harness. The rear cable lift motor is connected to the right cable spool and is configured to lift the rear of the parachute harness or, in an alternative configuration, the legs of the jumper while the present invention is in use. A traverse motor is connected to the multi-axis plate and is configured to adjust the positions of the right lift motor and the left lift motor in unison across the multi-axis plate. The traverse motor, in conjunction with the right lift motor, the left lift motor, and the rear lift motor, create a rotation about the y-axis (pitch).

In another preferred embodiment of the present invention, the jumper may control his or her turning movements while using the multi-axis parachute and skydiving modular simulator by pulling either the right or left steering cables which are connected to the right and left steering motors and affixed to the multi-axis plate and configured to allow a user to move the multi-axis plate to the left or to the right radially, while also banking the jumper along the roll axis. While worn by the user, the parachute harness assembly will allow for the user to experience the lift movements and jump forces through parachute flying motions. Specifically, the right lift motor and the left lift motor manipulate the right and left cables which are connected to the parachute harness. This will permit the jumper to rotate about and move along the z-axis, and also create rolling motion along the x-axis by offsetting left and right lifting cables. The rear lift motor and the rear cable, when connected to the parachute harness, will permit for the user to transition from a vertical position on the y-axis to a horizontal position on the x-axis, or in other words, pitch the jumper forward or backward. The gimbal assembly allows for the cable assembly to swing radial from the dome, controlling z-axis rotation or yaw movement. The resulting varying combination of movements allow the user to move up, down, right, left and to experience radial motions. In addition, the steering cables utilized by the jumper may create commands to the right lift motor and the left lift motor to define the motion path.

In a preferred embodiment of the present invention, the multi-axis parachute and skydiving module simulator is controlled by a control box that may be attached to the dome housing or, in the alternative to standalone housing outside of the dome housing. The control box comprises of at least one computer and configured to control the movements of the fan assembly, gimbal assembly, cable assembly, and cable steering assembly. The control box and the computer may collectively be referred to as a "control system". In some embodiments, the control system is configured to receive and process input from the steering cables, along with the plurality of body sensors and the plurality of sensors on the parachute harness. The plurality sensors, on both the body and the harness, provide input to the control system regarding the jumper's movement and the jumper's body position which creates a feedback loop between the fan assembly, gimbal assembly, cable assembly, cable steering assembly and plurality of body and harness sensors removably affixed to the jumper thereby controlling the multi-axis movement of the jumper. The input received by the control system will then direct the control system to lift the right lift motor, the left lift motor, and the rear lift motor. The control system will also direct the radial torque motor to rotate and move the gimbal. The combination of the rotations of the various motors of the present invention will impart movement to the modular simulator thus creating real world parachute flying movements to the jumper's body.

In other embodiments, the control box will display three dimensional ("3D") graphic data to the virtual display goggles, which will display graphics of the coordinated motion scenes. The virtual display goggles are configured to receive input from the computer regarding the movement and positioning of the jumper's body and harness during the simulation and to produce a visual output of virtual terrain and skyline based on the input received from the computer, correlating to the movement and position of the jumper's body and harness during the simulation. By way of non-limiting example, if the jumper moves his or her head to look down, the display will show the earth's terrain to the jumper. If the jumper moves his or her head to look up, the jumper will see the displayed image of the virtual parachute.

In another preferred embodiment of the present invention, a fan assembly may be used to create realistic wind forces that a jumper may experience during a parachute or skydiving activity. The fan assembly comprises of a support arm at its proximal end that extends from the gimbal plate frame or the interior of the dome housing, which support arm is configured to pivot to adjust wind directions, and a fan box at its distal end. In an alternative configuration and embodiment, while the modular simulator is in use, the fan assembly support arm may extend the fan to the bottom of the jumper, move to the top of the jumper, or move to the left or the right to provide a realistic air flow experience that mimics free falling and parachute flying.

The embodiments of the invention described herein are exemplary and numerous modifications, variations and rearrangements can be readily envisioned to achieve substantially equivalent results, all of which are intended to be embraced within the spirit and scope of the invention. Furthermore, while the preferred embodiment of the invention has been described in terms of the components and configurations, it is understood that the invention is not intended to be limited to those specific dimensions or configurations but is to be accorded the full breadth and scope of the spirit of the invention.

BRIEF DESCRIPTION OF THE DRAWINGS

These and other features, aspects and advantages of the present invention will become better understood with regard to the following description, appended claims, and accompanying figures where:

DETAILED DESCRIPTION

The present invention overcomes the limitations of the prior art by providing a new and novel multi-axis parachute and skydiving module simulator that will provide the combination of motions and simulations that will produce real parachute flight characteristics.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any embodiment or element of an embodiment disclosed in this disclosure will be determined by its intended use.

It is to be understood that the drawings and the associated descriptions are provided to illustrate potential embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known features, elements or techniques may not be shown in detail in order not to obscure the embodiments.

Figure 1:
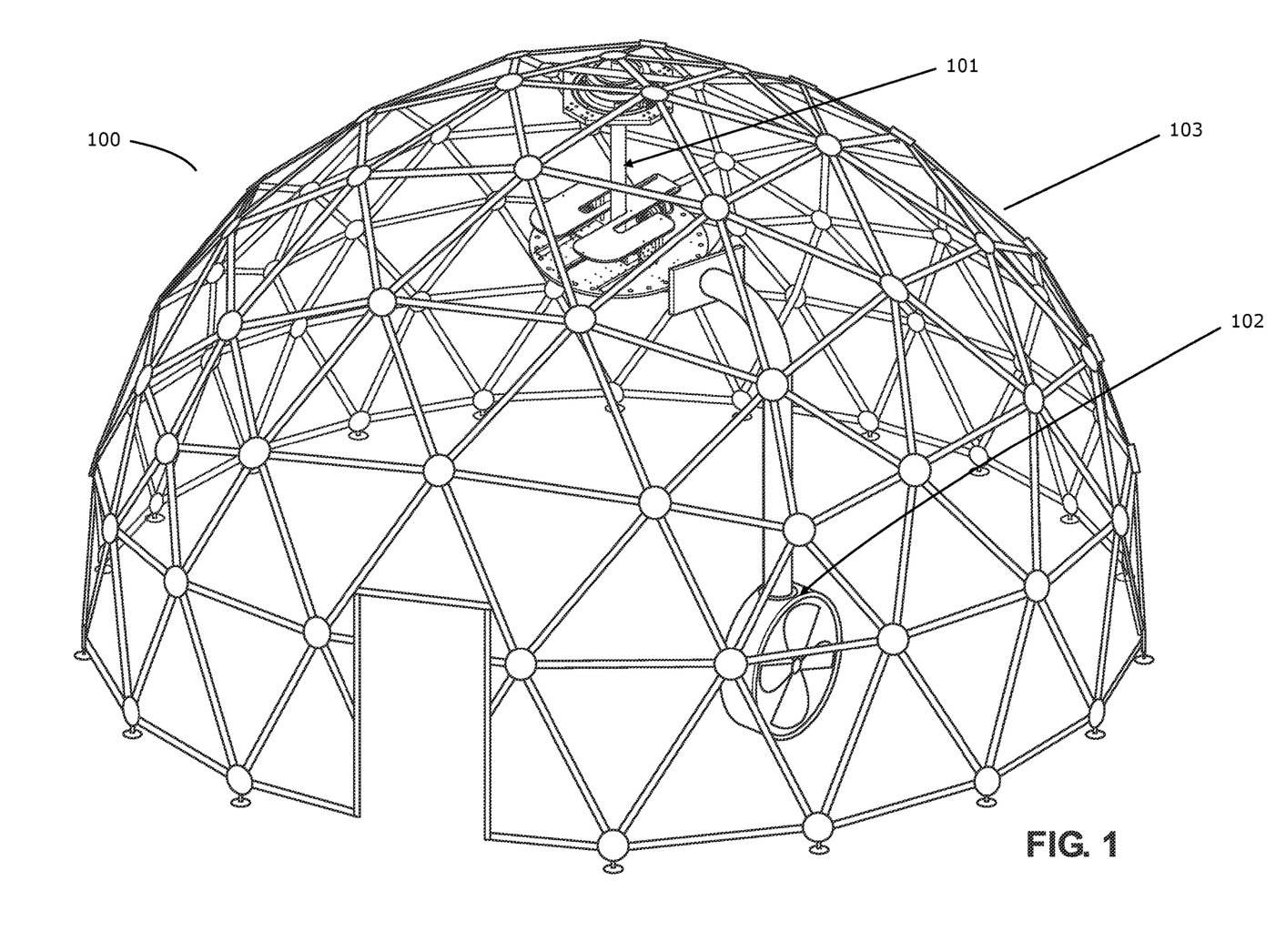
FIG. 1 shows a perspective view of a dome housing in accordance with an embodiment of the present invention.

Turning attention to FIG. 1, a perspective view of a 100 multi-axis parachute and skydiving module simulator is provided. In the view depicted, a viewer may perceive a 101 modular system and a 102 fan assembly located within the 103 dome assembly.

Figure 2:
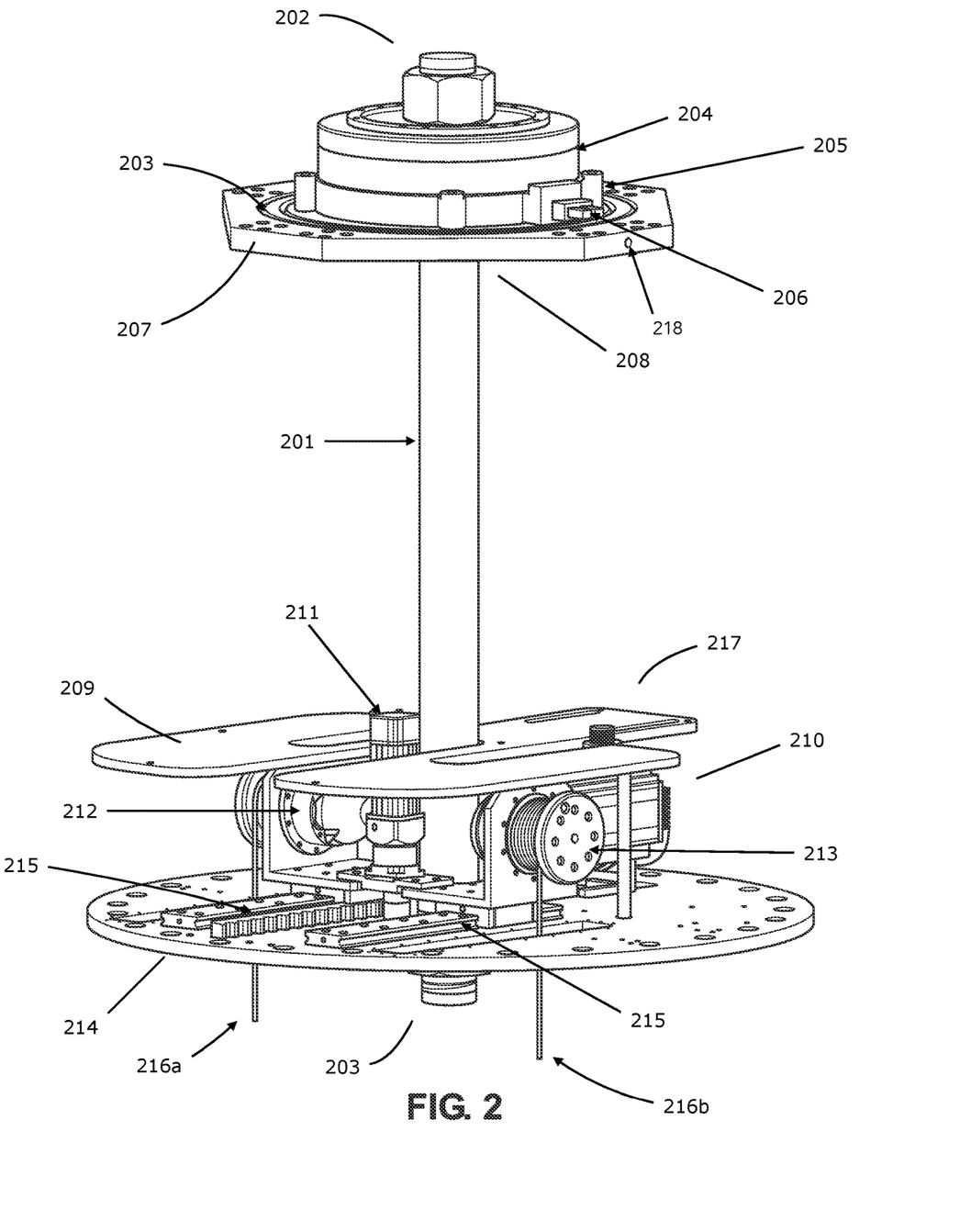
FIG. 2 shows a perspective view of the gimbal assembly at the proximal end of the stabilizing shaft and the cable assembly at the distal end of the stabilizing shaft, in accordance with a preferred embodiment of the present invention.

Turning to FIG. 2 a 202 gimbal assembly at the proximal end of the 201 stabilizing shaft and the 217 cable assembly at the 208 distal end of the stabilizing shaft, in accordance with a preferred embodiment of the present invention.

The 202 gimbal assembly comprises a 203 gimbal ring, 204 radial torque motor, a 205 motor housing, a 207 gimbal plate that are controlled by a series of 206 electrical connectors. When in use, the control box (not shown) commands the 202 gimbal assembly to move in a radial direction from the 208 distal end of the 201 stabilizing shaft. The 207 gimbal assembly further comprises of at least four 218 gimbal pins comprised of two sets of opposing pins which are affixed to the 203 gimbal ring.

The 217 cable assembly comprises a 209 top electronic plate (electronics and electrical connections not shown), a 210 rear lift motor, a 212 right lift motor, a 213 left lift motor, a 214 base movement plate, 216a right 216b and left steering cables, and at least one 215 movement track configured to move the 212 right lift motor, and a 213 left lift motor frontwards and backwards.

Figure 3:
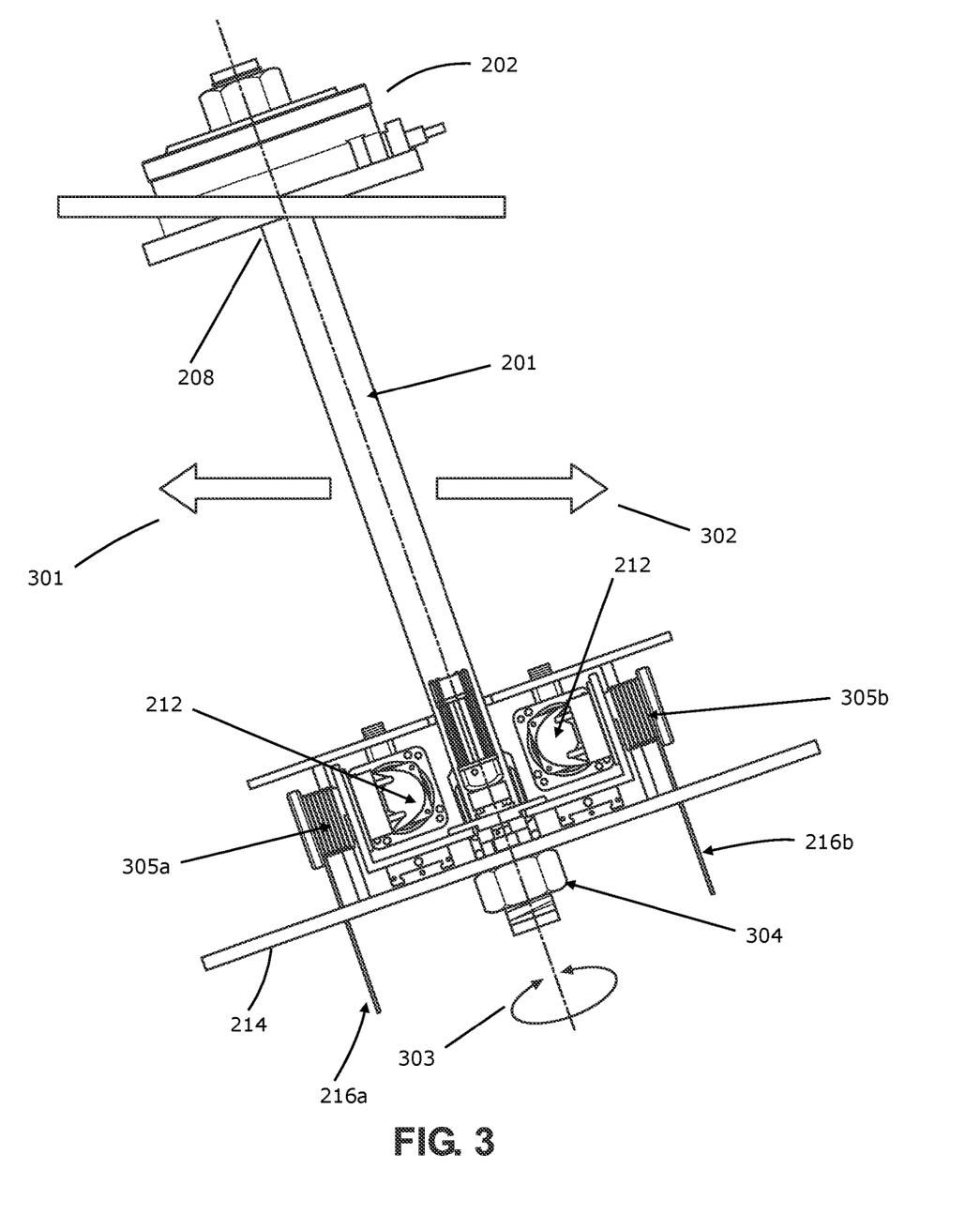
FIG. 3 shows a front view of the gimbal assembly at the proximal end of the stabilizing shaft and the cable assembly at the distal end of the stabilizing shaft, in accordance with a preferred embodiment of the present invention.

As shown in FIG. 3, the 202 gimbal assembly is located at the 208 proximal end of the 201 stabilizing shaft may move to the 301 or the 302 right or may cause the 201 stabilizing shaft and 217 cable assembly to move 303 radially.

Figure 4:
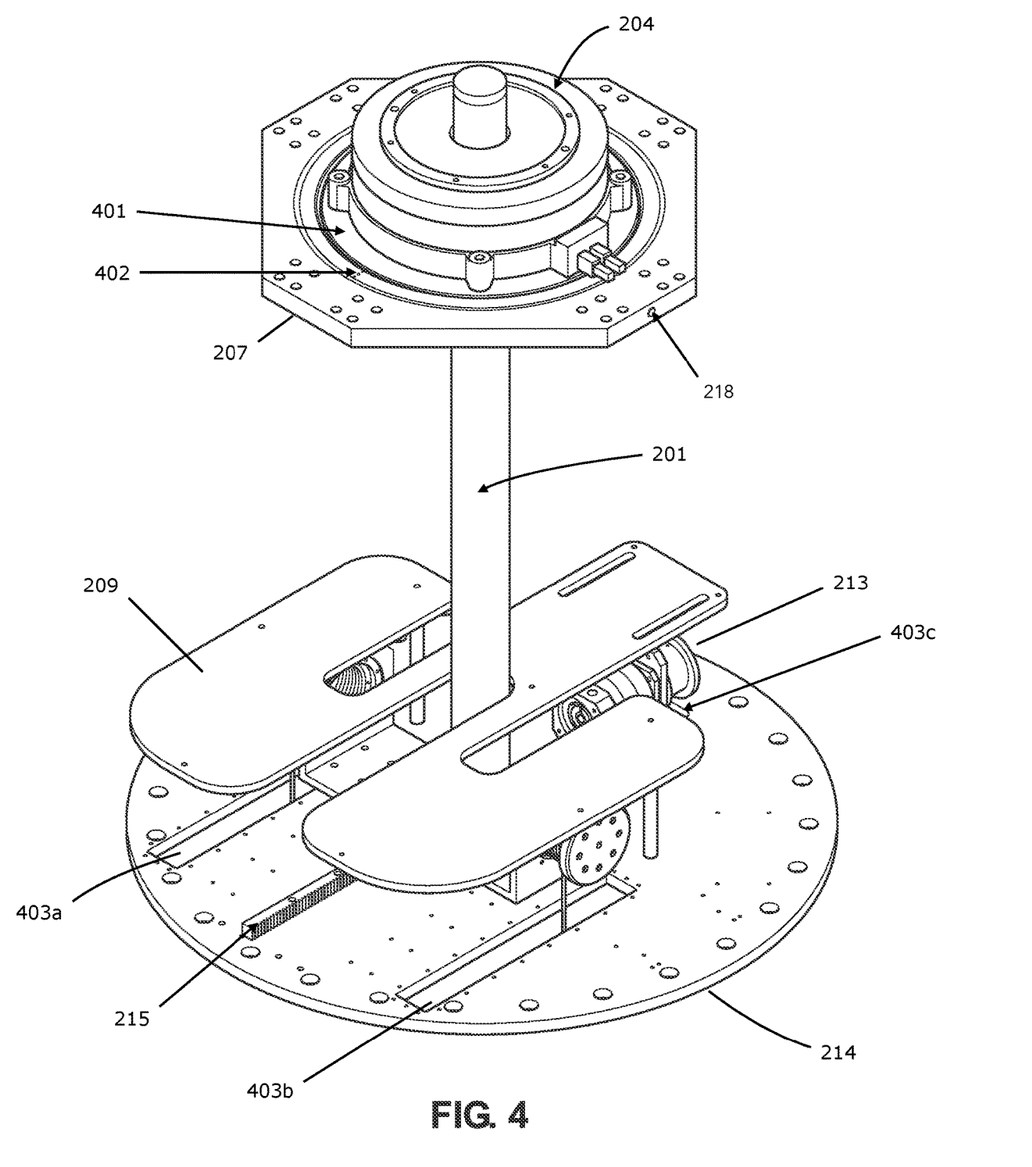
FIG. 4 shows a perspective view of the gimbal assembly in accordance with a preferred embodiment of the present invention.

Turning to FIG. 4, a perspective view of the gimbal assembly in accordance with a preferred embodiment of the present invention is shown. A viewer may perceive that the 202 gimbal assembly comprises a 401 motor plate that is interior of the 203 gimbal ring. The 203 gimbal ring is connected to the 207 gimbal plate by at least two of the 218 gimbal pins which allows for the 202 gimbal assembly to remain connected to the 207 gimbal plate during multi-directional movements. At least two of the 218 gimbal pins secured by 402 connection screws connect the 401 motor plate and the 203 gimbal ring. A viewer may also perceive that the 217 cable assembly further comprises of 403a right, 403b left and 403c rear cable openings which allow the 216a right 216b and left cables to move frontward and backwards as the 212 right lift motor and 213 left lift motor move along 215 at least one movement track.

Figure 5:
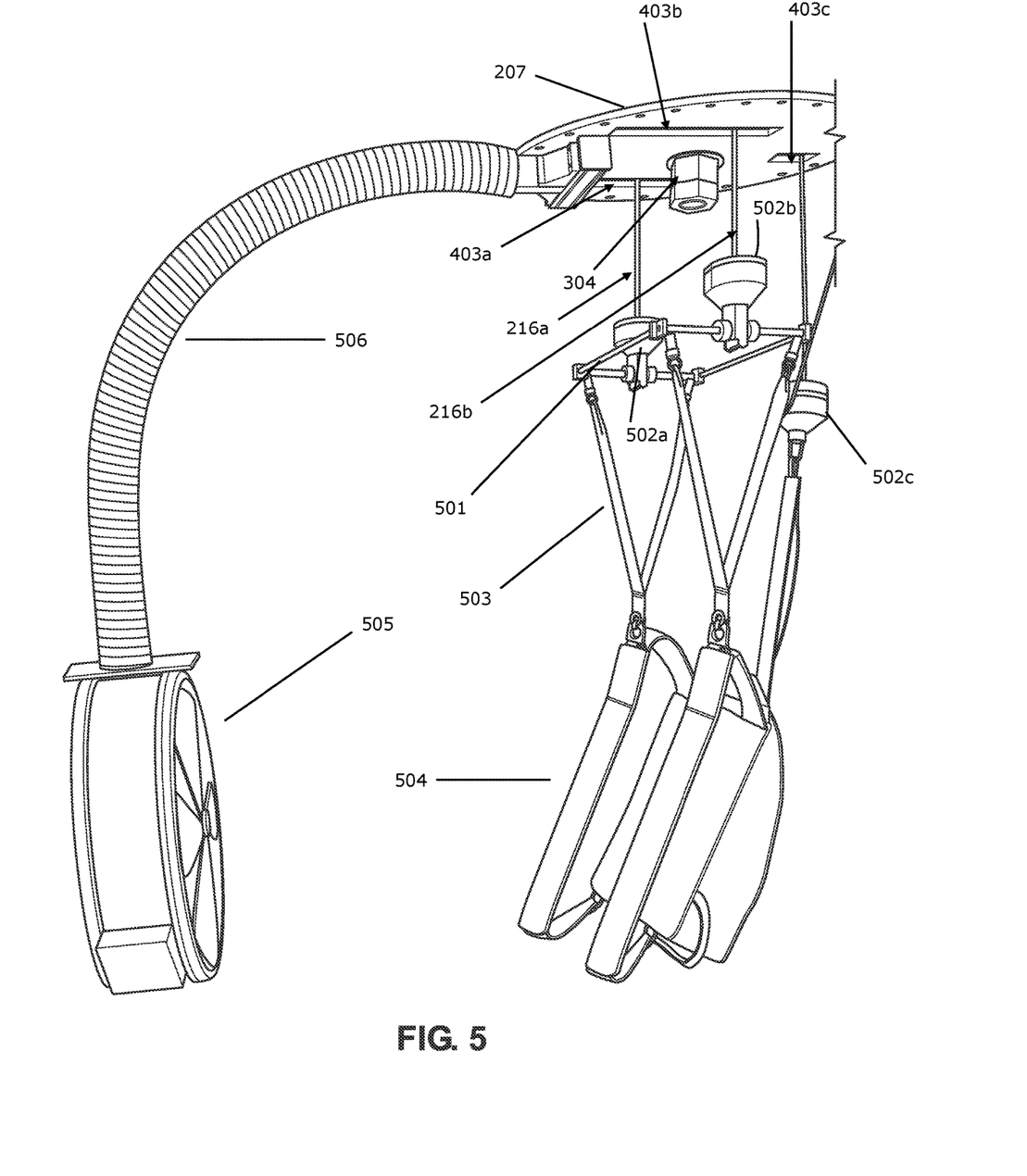
FIG. 5 shows a perspective view of the multi-axis disk, the parachute harness, and fan assembly in accordance with an embodiment of the present invention.

In FIG. 5 a perspective view of the multi-axis disk, the parachute harness, and fan assembly in accordance with an embodiment of the present invention is shown. The 216a right 216b left and 216c cables extend from the 207 base movement plate and are connected to the 501 multi-axis plate by means of corresponding 502a, 502b, and 502c cable steering assemblies. The 503 harness of the 504 parachute are connected to the bottom of the 501 multi-axis plate. A viewer may also perceive that the 505 fan assembly faces the 504 parachute and extends from the 506 fan arm.

Figure 6:
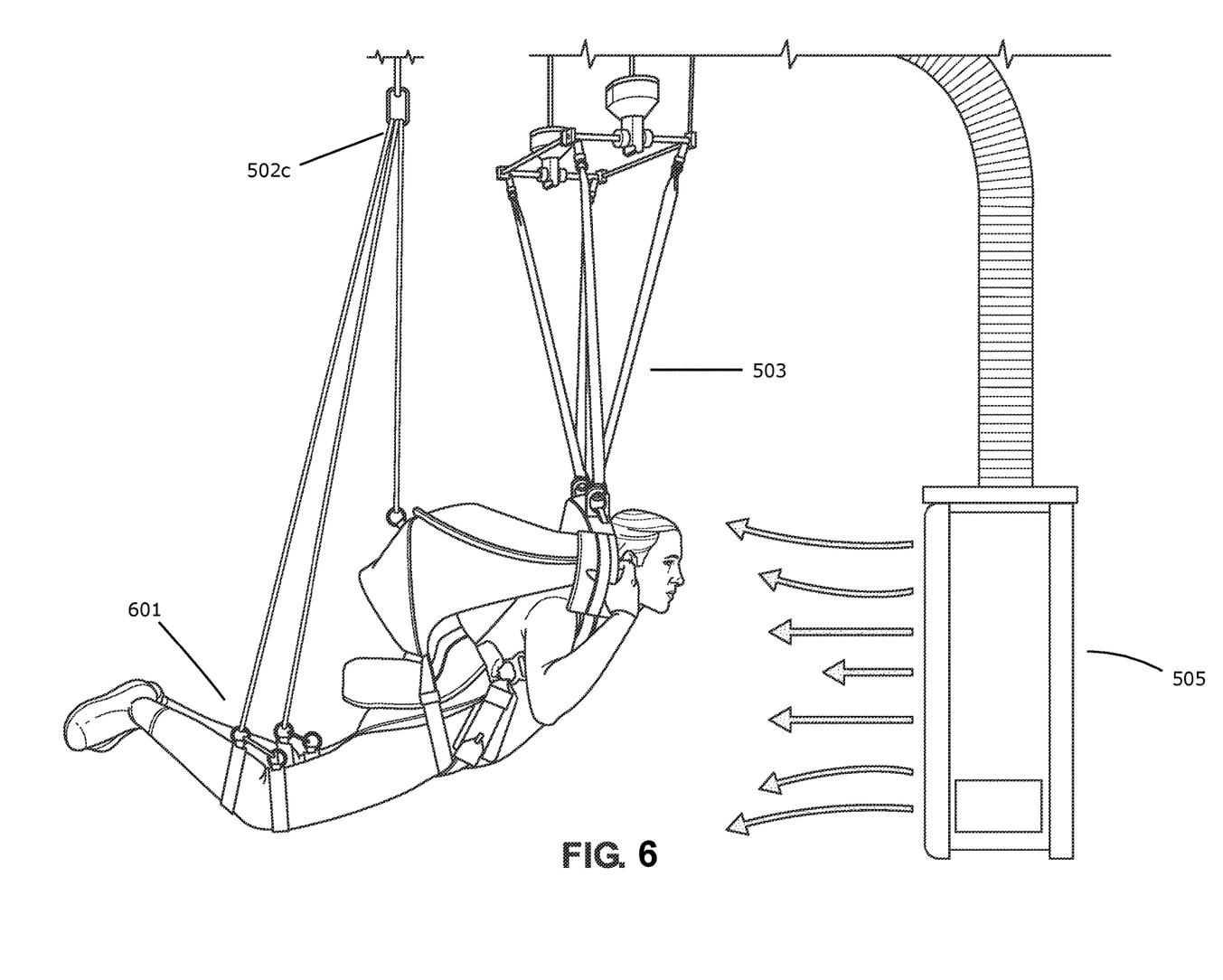
FIG. 6 shows a side perspective view of an alternative configuration of the present invention.

While in use, and as seen in FIG. 6, a jumper is connected to the 504 parachute which extends from the 503 harnesses that are attached to the 501 multi-axis plate, and faces the 505 fan assembly. A viewer may perceive an alternative configuration for the 502c rear cable which may connect to the back of the 504 parachute and the 601 leg straps of the jumper.

CONCLUSIONS, RAMIFICATIONS, AND SCOPE

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

While the present invention generally described herein has been disclosed in connection with a number of embodiments shown and described in detail, various modifications should be readily apparent to those of skill in the art.

What is claimed is:

1. A multi-axis parachute and skydiving module simulator comprising:
    a stabilizing shaft having at least one gimbal assembly at its proximal end and at least one cable assembly at its distal end;
    a cable steering assembly comprising of one multi-axis plate and least one left steering cable and at least one right steering cable coupled to at least one parachute harness;
    at least one parachute harness system comprising a plurality of sensors, a harness, and the at least one left steering cable and the at least one right steering cable coupled to the cable steering assembly;
    a fan assembly comprising a support arm at its proximal end and a fan box at its distal end; at least one traverse motor;
    at least one control box comprising at least one computer and configured to control the movements of the fan assembly, gimbal assembly, cable assembly, and cable steering assembly;
    a plurality of body sensors removably affixed to the jumper; and
    virtual reality goggles.

2. The multi-axis parachute and skydiving module simulator of claim 1 wherein the gimbal assembly comprises a gimbal ring, a radial torque motor, a motor housing, and a gimbal plate, and at least four gimbal pins configured to connect the motor plate, the gimbal ring, and the gimbal plate during multi-directional movements.

3. The multi-axis parachute and skydiving module simulator of claim 2 where the gimbal assembly is controlled by a computer that directs the gimbal assembly to move in a radial direction on the z-axis.

4. The multi-axis parachute and skydiving module simulator of claim 1 where the cable assembly comprises of an electronic housing, at least one rear lift motor, at least one rear lift cable, at least one right lift motor, at least one right lift cable, at least one left lift motor, at least one left lift cable, a base movement plate, and at least one movement track.

5. The multi-axis parachute and skydiving module simulator of claim 4 where the at least one rear lift motor is configured to raise and lower the rear lift cable.

6. The multi-axis parachute and skydiving module simulator of claim 4 where the at least one right lift motor is configured to raise and lower the right lift cable.

7. The multi-axis parachute and skydiving module simulator of claim 4 where the at least one left lift motor is configured to raise and lower the left lift cable.

8. The multi-axis parachute and skydiving module simulator of claim 4 where the at least one movement track is configured to move the stabilizing shaft frontwards and backwards.

9. The multi-axis parachute and skydiving module simulator of claim 1 where the cable steering assembly is located at the base of the base movement plate of the cable assembly.

10. The multi-axis parachute and skydiving module simulator of claim 1 where the cable assembly is configured to control the cable steering assembly.

11. The multi-axis parachute and skydiving module simulator of claim 1 where the steering cables of the cable steering assembly are configured to allow a user to move the multi-axis plate to the left or to the right radially, while also banking the jumper along the roll axis.

12. The multi-axis parachute and skydiving module simulator of claim 1 where the support arm of the fan assembly is affixed at the base of the base movement plate of the cable assembly and the fan box of the fan assembly is configured to simulate and direct air flow to the jumper's face and body.

13. The multi-axis parachute and skydiving module simulator of claim 1 where the at least one computer is configured to receive input from the plurality of body sensors removably affixed to the jumper and the plurality of sensors on the harness and send corresponding movement data output to the fan assembly, gimbal assembly, cable assembly, cable steering assembly.

14. The multi-axis parachute and skydiving module simulator of claim 13 where the computer creates a feedback loop between the fan assembly, gimbal assembly, cable assembly, cable steering assembly and plurality of body sensors removably affixed to the jumper thereby controlling the multi-axis movement of the jumper.

15. The multi-axis parachute and skydiving module simulator of claim 13 where the computer creates a feedback loop between the fan assembly, gimbal assembly, cable assembly, cable steering assembly and plurality of harness sensors thereby controlling the multi-axis movement of the jumper.

16. The multi-axis parachute and skydiving module simulator of claim 1 where the traverse motor is configured to create rotation about the y-axis.

17. The multi-axis parachute and skydiving module simulator of claim 1 where the virtual reality goggles are configured to receive input from the computer regarding the movement and positioning of the jumper's body and harness during the simulation.

18. The multi-axis parachute and skydiving module simulator of claim 1 where the virtual reality goggles are configured to produce a visual output of virtual terrain and skyline based on the input received from the computer, correlating to the movement and position of the jumper's body and harness during the simulation.

* * * * *